(12) United States Patent
Shigematsu et al.

(10) Patent No.: US 7,405,172 B2
(45) Date of Patent: Jul. 29, 2008

(54) NON-WOVEN FABRIC FOR SEPARATOR OF ALKALI CELL AND METHOD FOR PRODUCTION THEREOF

(75) Inventors: Toshihiro Shigematsu, Tokyo (JP); Shigehiro Maeda, Tokyo (JP); Takashi Katayama, Osaka (JP)

(73) Assignees: Mitsubishi Paper Mills Limited, Tokyo (JP); Kuraray Co., Ltd., Osaka (JP)

( * ) Notice: Subject to any disclaimer, the term of this patent is extended or adjusted under 35 U.S.C. 154(b) by 229 days.

(21) Appl. No.: 10/515,276

(22) PCT Filed: May 22, 2003

(86) PCT No.: PCT/JP03/06376

§ 371 (c)(1),
(2), (4) Date: Nov. 22, 2004

(87) PCT Pub. No.: WO03/098720

PCT Pub. Date: Nov. 27, 2003

(65) Prior Publication Data

US 2005/0221708 A1    Oct. 6, 2005

(30) Foreign Application Priority Data

May 22, 2002  (JP) ............................. 2002-147215

(51) Int. Cl.
*D04H 1/00*    (2006.01)
*B32B 27/04*   (2006.01)

(52) U.S. Cl. ...................... 442/415; 442/414; 442/333; 428/300.4

(58) Field of Classification Search ................ 442/333, 442/414, 415; 428/296.7, 300.4
See application file for complete search history.

(56) References Cited

U.S. PATENT DOCUMENTS 4,278,779 A * 7/1981 Nakagawa et al. .......... 525/432
6,037,079 A * 3/2000 Tanaka et al. ............... 429/142
6,887,930 B2 * 5/2005 Uchida et al. ............... 524/430
2001/0029138 A1 * 10/2001 Aikawa et al. ................ 442/59

FOREIGN PATENT DOCUMENTS

| EP | 1 205 986 A1 | 4/2001 |
|----|---|---|
| JP | 53-58636 | 5/1978 |
| JP | 56-003973 | 1/1981 |
| JP | 58-147956 | 9/1983 |
| JP | 58-175256 | 10/1983 |
| JP | 01-132042 | 5/1989 |
| JP | 05-283054 | 10/1993 |
| JP | 09-259856 | 10/1997 |
| JP | 11-111256 A | 4/1999 |
| JP | 200111039 A * | 10/1999 |
| JP | 2001-110390 * | 4/2001 |
| JP | 2001-126697 A | 5/2001 |
| JP | 2002-151041 A | 5/2002 |
| JP | 2002-201286 A | 7/2002 |
| JP | 2003-92097 A | 3/2003 |

* cited by examiner

*Primary Examiner*—Lynda Salvatore
(74) *Attorney, Agent, or Firm*—Birch, Stewart, Kolasch & Birch, LLP

(57) ABSTRACT

The present invention provides a non-woven fabric for an alkaline battery separator comprising semi-aromatic polyamide fibers comprising a dicarboxylic acid component, in which 60 mol % or more of the dicarboxylic acid component is an aromatic carboxylic acid component, and a diamine component, in which 60 mol % or more of the diamine component is an aliphatic alkylene diamine having 6 to 12 carbon atoms, and ethylene/vinyl alcohol copolymer fibers; wherein, the separator non-woven fabric has superior alkaline resistance in which the weight loss rate after 20 days is 5% or less in an alkaline resistance test at 90° C. in aqueous KOH solution having a specific gravity of 1.30. Consequently, since the present invention enables rapid charging and large-current discharging while also allowing thickness to be reduced for higher capacity, it can be preferably used as a non-woven fabric for an alkaline battery separator.

11 Claims, No Drawings

NON-WOVEN FABRIC FOR SEPARATOR OF ALKALI CELL AND METHOD FOR PRODUCTION THEREOF

TECHNICAL FIELD

The present invention relates to a non-woven fabric for an alkaline battery separator that can be preferably used in an alkaline secondary battery such as a nickel-cadmium battery, nickel-zinc battery, nickel-hydrogen battery or others, and a method for producing the same. More particularly, the present invention relates to a non-woven fabric for an alkaline battery separator that allows rapid charging and large current discharge, has a thin thickness enabling high capacity, and has superior alkaline resistance, and a method for producing the same.

BACKGROUND ART

Since alkaline secondary batteries comprising a positive electrode, separator and negative electrode have superior charging and discharging characteristics, superior overcharging and over-discharging characteristics, and can be used repeatedly owing to their long life, they are widely used in electronic equipment having extremely small size and weight. Non-woven fabric used in alkaline battery separators is known to fulfill roles that include separation of the positive and negative electrodes, prevention of short-circuit, retention of electrolyte, and permeation of gas generated by the electrode reactions. Consequently, this non-woven fabric is required to have alkaline resistance, hydrophilicity, liquid retention and oxidation resistance with respect to the electrolyte, and heat resistance with respect to the working temperature. In addition, a non-woven fabric for alkaline battery separators is also required to be provided with running stability when in a wound configuration in addition to mechanical properties such as tensile strength so as to be able to oppose the tension applied in the battery production process.

In recent years, in addition to allowing rapid charging and large current discharge, alkaline secondary batteries have also come to be required to have larger capacities. Increasing battery capacity can be realized by increasing the amounts of positive electrode active material and negative electrode active material. Consequently, attempts have been made to reduce the thickness of the separator by lowering the weighting capacity, namely the basis weight, of the separator non-woven fabric. However, if the thickness of the separator is reduced by lowering the basis weight of the separator non-woven fabric, since the liquid retention of the separator typically decreases, the life of the separator non-woven fabric shortens due to drying of the liquid resulting from repeated charging and discharging. In the case of dry non-woven fabric in particular, lowering of the basis weight causes a considerable loss of non-woven fabric uniformity, thereby increasing the susceptibility to short-circuit between the positive and negative electrodes and lowering leakage resistance. In addition, even in the case of a wet non-woven fabric, there is the risk of being unable to employ a wound configuration due to the significant reduction in tensile strength.

In consideration of the aforementioned reasons, the basis weight of non-woven fabric for alkaline battery separators is typically within the range of 50 to 80 $g/m^2$ and the thickness is typically within the range of 120 to 200 μm, and the capacity of alkaline secondary batteries was unable to be significantly improved.

On the other hand, a non-woven fabric using aliphatic polyamide fibers such as fibers made of Nylon 6 or Nylon 66 has come to be used as a non-woven fabric for alkaline battery separators that has superior hydrophilicity and liquid retention with respect to electrolyte and low electrical resistance when containing electrolyte. Alkaline secondary batteries using this aliphatic polyamide fiber non-woven fabric have superior alkaline resistance, high hydrophilicity and superior electrolyte retention, while also having the characteristic of superior discharge characteristics for large currents. However, this non-woven fabric lacks chemical stability, and has inferior heat resistance as represented with the glass transition temperature as well as inferior oxidation resistance at high temperatures in particular. Consequently, it has the disadvantage of being susceptible to oxidation and decomposition by oxygen gas generated during charging of the alkaline secondary battery, and causes a significant decrease in battery performance when the alkaline secondary battery is used under temperature conditions within the range of 60 to 80° C. Thus, alkaline secondary batteries in which an aliphatic polyamide fiber non-woven fabric is used for the separator non-woven fabric demonstrate large self-discharge caused by decomposition of the non-woven fabric, and particularly in the case of alkaline secondary batteries that undergo repeated charging and discharging at high temperatures, the cycle life is shortened considerably.

On the other hand, polyolefin fiber non-woven fabric has been used in alkaline secondary batteries requiring heat resistance at comparative high temperatures. Although polyolefin fiber non-woven fabric has superior heat resistance, since it is hydrophobic, it is resistant to wetting by electrolyte and has a low electrolyte retention volume. Consequently, this non-woven fabric has high electrical resistance when used as the separator non-woven fabric of an alkaline secondary battery, and is inferior in terms of rapid battery charging and large current discharge as compared with polyamide fiber non-woven fabric. In addition, since there is the risk of electrolyte retained between the fibers being pushed out from inside the separator due to the pressure of oxygen gas generated from the positive electrode during charging, eventually causing the positive electrode to expand due to repeated charging and discharging, there is the risk of the occurrence of dry out in cases in which the liquid retention of the alkaline battery separator non-woven fabric is insufficient.

Therefore, attempts have been made to treat alkaline battery separator non-woven fabric that uses polyolefin fibers with a surfactant. However, there are problems with the stability of the surfactant in electrolyte. In addition, since the surfactant is released when the period while repeated charging and discharging is in progress has elapsed, this has not led to adequate improvement of absorption and retention of electrolyte.

In order to solve the problem of hydrophobicity of alkaline battery separator non-woven fabric composed of a polyolefin fiber non-woven fabric, numerous methods have been proposed for improving absorption or retention of electrolyte by imparting hydrophilicity to the polyolefin fibers. For example, sulfonation treatment consisting of treatment with hot conc. sulfuric acid, fuming sulfuric acid or chlorosulfuric acid is disclosed in Japanese Unexamined Patent Publication No. Sho. 56-3973 and Japanese Unexamined Patent Publication No. Sho. 58-175256, while a method in which the structural surface of non-woven fabric is modified by fluorine treatment by treating with a gas containing fluorine, acrylic acid graft polymerization treatment in which groups having a hydrophilic group such as in acrylic acid or methacrylic acid are graft polymerized, corona discharge treatment or reducing fiber diameter and so forth is disclosed in Japanese Unexamined Patent Publication No. Hei. 1-132042. However, since the hydrophilic treatment methods described in these examples of the prior art cause a considerable decrease in strength in the alkaline battery separator non-woven fabric, cause deterioration of the appearance or attempt to reduce thickness by lowering the basis weight, they have problems including difficulty in enabling stable industrial production.

Therefore, inventions that use aromatic polyamide fibers or completely aromatic polyamide fibers for the alkaline battery separator non-woven fabric instead of aliphatic polyamide fibers are disclosed in, for example, Japanese Unexamined Patent Publications Nos. Hei. 5-283054, Sho. 53-58636 and Sho. 58-147956. Non-woven fabric composed of aromatic polyamide fibers or completely aromatic polyamide fibers typically have superior hydrophilicity as well as superior alkaline resistance and oxidation resistance. However, due to their high heat resistance, the adhesiveness itself of a non-woven fiber formed only of these fibers is low, and since the adhesiveness with typical thermoplastic binder fibers is particularly low, the non-woven fabric strength is inadequate. Although methods that use an adhesive resin have been considered for improving adhesiveness, when a non-woven fabric adhered according to these methods is used as a battery separator, there is the risk of the adhesive resin dissolving in the battery electrolyte.

So-called semi-aromatic polyamide fibers have been proposed to improve on the problem of adhesiveness. An alkaline battery separator that uses a semi-aromatic polyamide fiber (MXD-6 fiber) non-woven fabric formed from aromatic diamine and aliphatic dicarboxylic acid has inferior oxidation resistance at high temperatures, and may deteriorate as a result of being oxidized by oxygen gas generated during charging. On the other hand, semi-aromatic polyamide fibers formed from aliphatic diamine and aromatic dicarboxylic acid being able to be preferably used in battery separators as fibers having hydrophilicity, alkaline resistance and oxidation resistance is disclosed in, for example, Japanese Unexamined Patent Publications Nos. Hei. 9-259856 and 2002-151041.

However, semi-aromatic polyamide fibers formed from aliphatic diamine and aromatic dicarboxylic acid have low fiber strength and leakage resistance cannot be said to be adequate. In addition, since they also have high heat resistance in the same manner as aromatic polyamide fibers, it is necessary to mix them with thermoplastic binder resin fibers such as polyolefin fibers or others to increase adhesiveness between fibers and enhance the non-woven fiber strength. However, since the melting point of the thermoplastic binder resin is lower than the temperature environment in alkaline secondary batteries are used in large equipment (160° C. or higher), there is the risk of having a detrimental effect on long-term stability of the battery separator.

In this manner, semi-aromatic polyamide fiber non-woven fabric is promising as a non-woven fabric for alkaline battery separators. However, problems still remain with respect to adhesiveness with binder resin fibers, leakage resistance, further inhibition of self-discharge phenomena, and improving yield during alkaline secondary battery production in the case of reducing thickness by lowering the basis weight of the separator non-woven fabric. Moreover, this non-woven fabric is also unable to effectively respond to severe requirements for increasing battery capacity on the premise of rapid charging and large current discharge. Therefore, the object of the present invention is to provide a non-woven fabric for an alkaline battery separator, which is based on the use of a semi-aromatic polyamide fiber non-woven fabric, allows rapid charging and large current discharge, enables thickness to be reduced for higher battery capacity, and has superior alkaline resistance and a method for producing the same.

DISCLOSURE OF THE INVENTION

As a result of extensive research to solve the aforementioned problems, the inventors of the present invention invented a non-woven fabric for an alkaline battery separator that is based on the semi-aromatic polyamide fiber non-woven fabric of the present invention, and a method for producing the same.

Namely, the present invention relates to a non-woven fabric for an alkaline battery separator comprising semi-aromatic polyamide fibers formed from a dicarboxylic acid component in which 60 mol % or more of the dicarboxylic acid component is an aromatic carboxylic acid component, and a diamine component in which 60 mol % or more of the diamine component is an aliphatic alkylene diamine having 6 to 12 carbon atoms, and binder fibers in the form of ethylene/vinyl alcohol copolymer fibers, wherein the separator non-woven fabric has superior alkaline resistance in which the weight loss rate after 20 days is 5% or less in an alkaline resistance test at 90° C. in aqueous KOH solution having a specific gravity of 1.30.

In a non-woven fabric for an alkaline battery separator of the present invention, the semi-aromatic polyamide fibers are preferably 60 to 95% by weight, and the ethylene/vinyl alcohol copolymer fibers are preferably 5 to 40% by weight. In addition, the ethylene/vinyl alcohol copolymer fibers preferably have a mono-filament fineness (diameter of the monofilament) of 0.01 to 0.5 dtex, and the semi-aromatic polyamide fibers are preferably formed from a dicarboxylic acid component comprising a terephthalic acid component and a diamine component comprising a 1,9-nonane diamine component or a mixture of that and a 2-methyl-1,8-octane diamine component.

In addition, in the present invention, in addition to semi-aromatic polyamide fibers and binder fibers, division type composite fibers are preferably also contained that are formed from semi-aromatic polyamide and at least one type of polymer selected from the group consisting of poly-phenylene sulfide, polymethylpentene and polypropylene.

Moreover, in the present invention, in addition to the semi-aromatic polyamide fibers and binder fibers, non-stretched semi-aromatic polyamide fibers or high-strength fibers are preferably also contained.

A non-woven fabric for an alkaline battery separator of the present invention preferably also has a basis weight of 45 g/m² or less, thickness of 100 μm or less, tensile strength of 1960 N/m or more, maximum pore diameter of 50 μm or less, and average pore diameter of 20 μm or less.

In addition, a method for producing a non-woven fabric for an alkaline battery separator contains a step of preparing a dispersed slurry containing a mixture of semi-aromatic polyamide fibers and ethylene/vinyl alcohol copolymer fibers, a step of producing a raw fabric from the dispersed slurry using a wet papermaking method, and a step of subjecting to hydrophilic treatment and calendaring treatment on both sides of the raw fabric. This dispersed slurry more preferably comprises a dispersed slurry in which division type composite fibers, preliminarily split into at least two types of ultrafine fibers with a refining machine, are additionally contained.

BEST MODE FOR CARRYING OUT THE INVENTION

The following provides a detailed explanation of a non-woven fabric for an alkaline battery separator of the present invention.

A non-woven fabric for an alkaline battery separator of the present invention contains semi-aromatic polyamide fibers prepared from a dicarboxylic acid component, in which 60 mol % or more of the dicarboxylic acid component is an aromatic carboxylic acid component, and a diamine component in which 60 mol % of the diamine component is an aliphatic alkylene amine having 6 to 12 carbon atoms, and ethylene/vinyl alcohol copolymer fibers. This separator non-woven fabric has superior alkaline resistance in which the weight loss rate after 20 days is 5% or less in an alkaline resistance test at 90° C. and aqueous KOH solution having a specific gravity of 1.30.

As a result of using semi-aromatic polyamide fibers, the separator non-woven fabric has superior chemical stability such as alkaline resistance and oxidation resistance, and has the characteristic of low electrical resistance in the state of containing electrolyte. Consequently, discharge characteristics at large current can be improved without having a detrimental effect on self-discharge or cycle life caused by fiber deterioration and decomposition. In addition, as a result of using ethylene/vinyl alcohol copolymer fibers preferably having a mono-filament fineness of 0.01 to 0.5 dtex for the binder fibers, the separator non-woven fabric is able to demonstrate tensile strength and hardness capable of opposing battery assembly machinery by powerfully holding together the composite fibers without increasing the internal resistance of the non-woven fabric for an alkaline battery separator, and without crushing the voids in the non-woven fabric or impairing retention of electrolyte.

Furthermore, the alkaline resistance of a non-woven fabric for an alkaline battery separator has an effect on the cycle life characteristics of the battery. Amidst growing requirements to increase battery capacity and increase battery output, the temperature that is reached inside the battery due to the charging and discharging cycle is tending to become even higher. Deterioration of a battery separator non-woven fabric caused by its decomposition in a high-temperature aqueous alkaline solution lowers the liquid retention of the separator non-woven fabric and impairs the function of the active material or cadmium as a protective film of dendride growth, thereby accelerating deterioration of cycle life.

Thus, the alkaline resistance of a separator non-woven fabric is preferably such that the weight loss ratio of the non-woven fabric at 90° C. and aqueous KOH solution having a specific gravity of 1.30 is within 1% after 7 days, within 2% after 14 days and within 5% after 20 days. In the case the weight loss ratio of the separator non-woven fabric after 20 days is within 5%, decreases in strength and liquid retention of the separator non-woven fabric as well as the occurrence of increases in pore diameter can be prevented, thereby making it possible to secure a longer cycle life.

A non-woven fabric for an alkaline battery separator of the present invention preferably has tensile strength of 1960 N/m or more in order to oppose the tension of automatic winding assembly machines. If the tensile strength is greater than or equal to 1960 N/m, the separator non-woven fabric is able to withstand the tension of automatic winding assembly machines, thereby allowing it to be reliably wound since the occurrence of short-circuit can be prevented, even if the width becomes narrow, without breaking.

In addition, pore diameter of a non-woven fabric for an alkaline battery separator has an effect on leakage resistance and dendride resistance characteristics. Leakage resistance and dendride resistance characteristics are also dependent on the basis weight and thickness of the non-woven fabric, and even in cases in which the maximum pore diameter exceeds 50 μm and the average pore diameter exceeds 20 μm, the non-woven fiber can be used as a separator non-woven fabric. However, in order to realize low basis weight and low thickness for the purpose of increasing battery capacity and large-current discharge, the maximum power diameter is preferably 50 μm or less and the average pore diameter is preferably 20 μm or less. As a result, the process defect rate and dendride resistance characteristics can be kept satisfactory.

The following provides a detailed explanation of each of the composite fibers used in the present invention.

A. Semi-Aromatic Polyamide Fibers

The polyamide of the semi-aromatic polyamide fibers used in the present invention can be obtained by preparing from a dicarboxylic acid component in which 60 mol % or more of the dicarboxylic acid component is an aromatic dicarboxylic acid, and a diamine component in which 60 mol % or more of the diamine component is an aliphatic alkylene diamine having 6 to 12 carbon atoms.

In consideration of the strength of the non-woven fabric and the heat resistance and chemical resistance of the separator, preferable examples of the aromatic dicarboxylic acid component include terephthalic acid, isophthalic acid, 2,6-naphthalene dicarboxylic acid, 2,7-naphthalene dicarboxylic acid, 1,4-naphthalene dicarboxylic acid, 1,4-phenylene dioxydiacetic acid, 1,3-phenylene dioxydiacetic acid, diphenic acid, dibenzoic acid, 4,4'-oxydibenzoic acid, diphenylmethane-4,4'-dicarboxylic acid, diphenylsulfone-4,4'-dicarboxylic acid, 4,4'-biphenyl dicarboxylic acid, etc., with terephthalic acid being the most preferable. These aromatic dicarboxylic acids can be used alone or in a combination of two or more types.

The content of the aromatic dicarboxylic acid in the dicarboxylic acid component is required to be 60 mol % or more of the dicarboxylic acid component, preferably 75 mol % or more and most preferably 100%. As a result of making the content of the aromatic dicarboxylic acid 60 mol % or more, various characteristics such as alkaline resistance, oxidation resistance and strength can be secured for the resulting fibers.

Examples of the dicarboxylic acid components other than the aromatic dicarboxylic acids include aliphatic dicarboxylic acids such as malonic acid, dimethyl malonic acid, succinic acid, 3,3-diethylsuccinic acid, glutaric acid, 2,2-dimethylglutaric acid, adipic acid, 2-methyl-adipic acid, trimethyladipic acid, pimelic acid, azelaic acid, sebacic acid and suberic acid; and alicyclic dicarboxylic acids such as 1,3-cyclopentane dicarboxylic acid and 1,4-cyclohexane dicarboxylic acid, and these acids can be used alone or in a combination of two or more types.

In addition, polyvalent carboxylic acids such as trimellitic acid, trimesic acid and pyromellitic acid may also be contained within a range that facilitates fiber formation and production of non-woven fabric.

In addition, 60 mol % or more of the diamine component is composed of an aliphatic alkylene diamine having 6 to 12 carbon atoms. Examples of this aliphatic alkylenediamine include linear or branched aliphatic diamines such as 1,6-hexanediamine, 1,8-octanediamine, 1,9-nonanediamine, 1,10-decanediamine, 1,11-undecanediamine, 1,12-dodecanediamine, 2-methyl-1,5-pentanediamine, 3-methyl-1,5-pentanediamine, 2,2,4-trimethyl-1,6-hexanediamine, 2,4,4-trimethyl-1,6-hexanediamine, 2-methyl-1,8-octanediamine and 5-methyl-1,9-nonanediamine. In consideration of heat resistance, hydrolysis resistance and chemical resistance in particular, 1,9-nonanediamine or a mixture of 1,9-nonanediamine and 2-methyl-1,8-octanediamine is preferable. In a mixture of 1,9-nonanediamine and 2-methyl-1,8-octanediamine, the respective molar ratios are preferably from 30:70 to 99:1, and more preferably from 40:60 to 95:5.

The content of aliphatic alkylene diamine is required to be 60 mol % or more of the diamine component, and in consideration of heat resistance, preferably 75 mol % or more and particularly preferably 90 mol % or more. As a result, the oxidation resistance and strength of the resulting fibers can be improved.

The intrinsic viscosity [η] as measured at 30° C. in conc. sulfuric acid is preferably within the range of 0.5 to 2.0 dl/g, more preferably 0.6 to 1.8 dl/g and particularly preferably 0.6 to 1.5 dl/g. Semi-aromatic polyamide fibers having an intrinsic viscosity within this range have satisfactory melt viscosity characteristics during fiber formation, and the strength and alkaline resistance of the resulting separator are superior.

Furthermore, in a semi-aromatic polyamide fiber used in the present invention, 10% or more of the end groups of its molecular chain are preferably sealed by an end sealing agent, more preferably 40% or more of the end groups are sealed, and most preferably 70% or more of the end groups are sealed. The resulting fibers and non-woven fabric have superior strength, alkaline resistance and oxidation resistance as a result of sealing the polyamide ends. Although there are no particular restrictions on the end sealing agent provided it is a mono-functional compound having reactivity with an amino group or carboxyl group on the end of a polyamide, monocarboxylic acids and monoamines are preferable in consideration of reactivity and stability of the sealed ends.

There are no particular restrictions on the production method of a polyamide of semi-aromatic polyamide fibers, and any known production method can be used for producing crystalline polyamide. For example, it is possible to carry out polymerization by a liquid polymerization method or interfacial polymerization that uses acid chloride and diamine for the raw materials, a melt polymerization, solid phase polymerization or melt extrusion polymerization that uses dicarboxylic acid and diamine for the raw materials.

The fiber diameter of the semi-aromatic polyamide fibers is such that the monofilament fineness is preferably 1.5 dtex or less in consideration of leakage resistance, liquid absorption and liquid retention, and the mono-filament fineness is more preferably 1.0 dtex or less in consideration of gas permeability and not inhibiting the hardness of the separator non-woven fabric. Furthermore, fiber diameter refers to the value based on a circular cross-section.

The fiber length of the semi-aromatic polyamide fibers is preferably 2 to 20 mm. If the fiber length exceeds 20 mm, it becomes difficult to disperse the fibers during wet papermaking, and insufficient basis weight and defective alignment occur, making it difficult to form a satisfactory raw fabric. In addition, since re-aggregation tends to occur after the fibers have been dispersed, there is susceptibility to the occurrence of slipping, tangling and doffing. On the other hand, if the fibers are less than 2 mm in length, the rupture elongation of the battery separator non-woven fabric decreases resulting in increased susceptibility to breakage and tearing when subjected to pressure from the edges of the plates.

Although dependent on basis weight, the blending ratio of semi-aromatic polyamide fibers in a non-woven fabric for an alkaline battery separator is preferably 60 to 95% by weight in consideration of gas permeability, liquid absorption and charging and discharging characteristics. If the blending ratio is less than 60% by weight, since the blending ratio of the binder fibers increases, although the tensile strength of the separator non-woven fabric becomes higher, electrolyte absorption decreases and electrical resistance increases. Consequently, the internal resistance of the alkaline secondary battery increases resulting in a decrease in charging and discharging characteristics. On the other hand, if the blending ratio exceeds 95% by weight, since the blending ratio of the binder fibers decreases, the tensile strength of the non-woven fabric decreases and leakage resistance becomes poor. Consequently, it becomes difficult crush the non-woven fabric by reducing its thickness.

B. Ethylene/Vinyl Alcohol Copolymer Fibers

In the present invention, ethylene/vinyl alcohol copolymer fibers having high hydrophilicity and hygrothermal adhesiveness under low-temperature pressure are used as binder fibers.

The fiber diameter is such that the monofilament fineness is preferably 0.01 to 0.5 dtex. If the monofilament fineness exceeds 0.5 dtex, since the number of fibers per unit volume decreases, it becomes necessary to increase the blending ratio of the binder fibers. In addition, since the moisture content of the wet paper roll during wet papermaking decreases, stable fabric production becomes difficult. In the case the monofilament fineness is less than 0.01 dtex, in addition to worsening of the mechanical properties and durability of the fibers themselves, it also becomes difficult to disperse the fibers during wet papermaking.

As a result of using ultrafine fibers within the aforementioned range for the ethylene/vinyl alcohol copolymer fibers, the tensile strength of the battery separator non-woven fabric can be increased while using a low blending ratio, and the tensile strength able to oppose the tension of the battery production process can be maintained even if the basis weight is lowered.

The fiber length of the ethylene/vinyl alcohol copolymer fibers is preferably 2 to 20 mm for the same reasons as the fiber length of the semi-aromatic polyamide fibers.

In order to effectively spin fibers having high mechanical strength and resistant to the occurrence of sticking, the melt flow rate (MFR as determined in compliance with JIS K 7210 at a testing temperature of 190° C. and testing load of 2.16 kgf) of the ethylene/vinyl alcohol copolymer fibers is preferably 0.5 to 50 g/10 minutes, and in order to further improve ease of spinning, is more preferably 3 to 25 g/10 minutes. On the other hand, the melt flow rate is more preferably 20 g/10 minutes or less in consideration of mechanical properties.

In addition, the ethylene content in the ethylene/vinyl alcohol copolymer is preferably 20 to 70 mol %, more preferably 30 to 55 mol % and particularly preferably 35 to 50 mol %. If the ethylene content is less than 20 mol %, problems occur with durability and so forth, and if the ethylene content exceeds 70 mol %, hydrophobicity becomes excessively high. On the other hand, the content of the vinyl alcohol unit is preferably 30 to 80 mol %, more preferably 45 to 70 mol %, and particularly preferably 50 to 65 mol %.

Although there are no particular restrictions on the production method of ethylene/vinyl alcohol copolymer used in the present invention, it can be efficiently produced by gelling ethylene/vinyl acetate copolymer. In addition, in consideration of ease of spinning and hot water resistance, the average molecular weight of the ethylene/vinyl alcohol copolymer is 500 to 5000, and more preferably about 800 to 3500.

Although ultrafine fibers composed of ethylene/vinyl alcohol copolymer fibers can be obtained by spinning those fibers only, a method is preferably employed in which multi-component fibers having ethylene/vinyl alcohol copolymer as one of their components are spun followed by removing or separating the other components of the resulting multi-component fibers. In particular, a method in which sea-island fibers having ethylene/vinyl alcohol copolymer for their island component are spun, followed by removing the sea component of the sea-island fibers, is preferable due to the ease of thread production.

There are no particular restrictions on a polymer that is compound-spun or mix-spun with ethylene/vinyl alcohol copolymer provided it does not substantially impair the performance of the copolymer. Examples of such polymers include polyamide (preferably Nylon 6) that can be removed with an acidic aqueous solution, and an easily alkaline-removable polyester capable of being removed with an alkaline aqueous solution. The use of the easily alkaline-removal polyester is preferable in consideration of spinning ease, weight loss processing and costs.

C. Containment of Division Type Composite Fibers

In addition to semi-aromatic polyamide fibers and binder fibers composed of ethylene/vinyl alcohol copolymer, a non-woven fabric for an alkaline battery separator of the present invention preferably contains division type composite fibers formed from this semi-aromatic polyamide and at least one type of polymer(s) selected from the group consisting of polyphenylene sulfide, polymethylpentene and polypropylene. As a result, together with enhancing absorption and retention of electrolyte, basis weight and thickness can be reduced without impairing leakage resistance, thereby making it possible to increase the capacity of an alkaline secondary battery. In addition, the basis weight, thickness, tensile strength and pore diameter of the non-woven fabric can be easily controlled in the production of a non-woven fabric for an alkaline battery separator.

A semi-aromatic polyamide in the division type composite fibers is obtained by a method previously described. The polyphenylene sulfide is of a linear type, and the polymethylpentene is poly-4-methylpentene-1 and copolymers thereof. Examples of the copolymer include those resulting from copolymerization of 4-methylpentene-1 and one or more kinds of, for example, ethylene, propylene, butene-1, hexene-1, octene-1, setene-1, tetrasetene-1 and octadecene-1.

In addition, there are no particular restrictions on the compounded form in the fiber cross-sections of the division type composite fibers formed from semi-aromatic polyamide and at least one type of polymer selected from the group consisting of polyphenylene sulfide, polymethyl-pentene and polypropylene provided the cross-sectional shape can be split after spinning. For example, complex fibers can be used in which the shape of the mono-filament cross-section after splitting is wedge-shaped, of the bimetal type (strip-shaped) or a laminated combination thereof. In consideration of increasing leakage resistance, the monofilament cross-sectional shape after splitting is particularly preferably of the bimetal type.

In consideration of ease of splitting, all of the components that compose the complex fibers are preferably split into two or more regions by other components in the fiber horizontal cross-section, and the total number of splits in the complex fiber horizontal cross-section (total number of regions, total number of layers) is more preferably from 8 to 20. In addition, in consideration of ease of splitting and ease of spinning, each layer is preferably substantially continuous in the lengthwise direction of the fibers.

The fiber diameter of each region (layer) that composes the complex fibers is such that the mono-filament fineness is preferably 0.6 dtex or less and more preferably 0.3 dtex or less in consideration of liquid absorption and liquid retention to electrolyte, ease of splitting, and separation performance as a battery separator non-woven fabric, while the monofilament fineness is preferably 0.01 dtex or more in consideration of not inhibiting unidirectional gas permeability. The fiber length of the division type composite fibers is preferably 2 to 20 mm for the same reasons as the fiber length of the semi-aromatic polyamide fibers.

The blending ratio of the division type composite fibers is preferably such that they are contained at 5 to 30% by weight in a non-woven fabric for an alkaline battery separator in consideration of liquid absorption, liquid retention, and gas permeability, and more preferably 10 to 20% by weight in consideration of leakage resistance. If the blending ratio is less than 5% by weight, the effects of lowering basis weight and reducing thickness are unable to be demonstrated as compared with a non-woven fabric composed of semi-aromatic polyamide fibers and ethylene/vinyl alcohol copolymer fibers. On the other hand, if the blending ratio exceeds 30% by weight, although leakage resistance is improved, charging and discharging characteristics decrease due to inhibition of gas permeability.

D. Containment of Non-Stretched Semi-Aromatic Polyamide Fibers

A non-woven fabric for an alkaline battery separator of the present invention can additionally be composed of a non-woven fabric containing non-stretched semi-aromatic polyamide fibers.

Here, non-stretched polyamide fibers refer to fibers in which, for example, crystallization and orientation are minimized as much as possible to prevent the occurrence of a stretched orientation in a production process in which molten semi-aromatic polyamide resin is extruded from a nozzle, cooled to a solid, formed into threads and then taken up by a roller. The semi-aromatic polyamide fibers of the present invention are products of heating and stretching these non-stretched polyamide fibers.

Since non-stretched polyamide fibers have numerous non-crystalline sections as compared with semi-aromatic polyamide fibers, and these non-crystalline sections are susceptible to deformation at temperatures equal to or above the glass transition temperature, they can be used as binder fibers of semi-aromatic polyamide fibers. In addition, since non-stretched polyamide fibers have superior hydrophilicity in the same manner as the semi-aromatic polyamide fibers, a battery separator can be obtained that has high liquid retention.

The blending ratio of non-stretched polyamide fibers is preferably 1 to 10% by weight with respect to the semi-aromatic polyamide fibers and ethylene/vinyl alcohol copolymer fibers. If non-stretched polyamide fibers are added within this range, the liquid retention rate can be increased without affecting battery life.

E. High-Strength Fibers

A non-woven fabric for an alkaline battery separator of the present invention can also be constituted by a non-woven fabric additionally containing high-strength fibers. This is because the use of a non-woven fabric containing a combination of semi-aromatic polyamide fibers having superior chemical stability such as heat resistance, oxidation resistance and others as well as superior adhesiveness with thermoplastic binder, and high-strength fibers having superior hydrophilicity, alkaline resistance and mechanical strength makes it possible to significantly reduce the defect rate during battery production without causing problems such as tearing of the separator or short-circuit of the electrodes during battery production.

High strength and high elastic modulus fibers having a tensile strength of 15 cN/dtex or more, tensile elastic modulus of 400 cN/dtex or more and rupture elongation of 10% or less are preferable for the high-strength fibers, examples of which include Kevlar (registered trademark), Xyron (registered trademark), Kuralon K-II (registered trademark) manufactured by Kuraray Co., Ltd. and Dainimer (registered trademark) fibers. As a result of containing high-strength fibers, rupture and short-circuit caused by stretching of the separator can be prevented in the case of high-speed winding.

High-strength fibers are preferably contained within the range of 1 to 10% by weight with respect to the total amount of fibers. If within this range, the occurrence of interlayer separation or decreased mechanical strength of a non-woven fabric accompanying decreased adhesiveness between fibers can be avoided in a non-woven fabric for an alkaline battery separator that contains semi-aromatic polyamide fibers and ethylene/vinyl alcohol copolymer fibers.

Completely aromatic polyamide fibers are particularly preferable for the high-strength fibers, examples of which include meta-type completely aromatic polyamide fibers such as poly-m-phenylene isophthalamide and poly-m-xylene terephthalamide, or para-type completely aromatic polyamide fibers comprising a resin component such as poly-p-phenylene terephthalamide, poly-p-benzamide, poly-p-amidohydrazide, and poly-p-phenylene terephthalamide-3,4-diphenyl ether terephthalamide. Para-type completely aromatic polyamide fibers are particularly preferable since they impart superior electrical insulation to a battery separator.

In addition, the fiber diameter of the high-strength fibers is preferably 1.5 dtex or less and more preferably 1.0 dtex or less similar to the semi-aromatic polyamide fibers.

Basis Weight

Although there are no particular restrictions on the basis weight of a non-woven fabric for an alkaline battery separator, in order to achieve the object of higher capacity for an alkaline secondary battery, the basis weight is preferably 45 g/m$^2$ or less and more preferably 40 g/m$^2$ or less. On the other hand, a basis weight of 30 g/m$^2$ or more is preferable in consideration of leakage resistance.

In addition, although there are also no restrictions on thickness, in order to lower the internal resistance, increase the amount of active material or increase the plate length, and achieve the object of higher capacity for an alkaline secondary battery, the thickness if preferably 100 μm or less and more preferably 80 μm or less. On the other hand, the thickness is preferably 60 μm or more in consideration of leakage resistance.

Production Method of a Non-Woven Fabric for an Alkaline Battery Separator

Next, a description is provided of a production method of a non-woven fabric for an alkaline battery separator of the present invention.

The raw fabric of a non-woven fabric for an alkaline battery separator can be produced by a wet papermaking method, carding method, cross layer method or other known method using each of the aforementioned types of fibers.

Although the carding and cross layer methods are able to use fibers having a long fiber length, it is difficult to form uniform rolls, alignment is poor and when observed with transmitted light, a spotted pattern is observed. Consequently, there is the problem of having to use a high basis weight in order to obtain a void diameter required to prevent short-circuit.

Moreover, although splitting using a needle punch method, water punch method or other means is required for splitting of division type composite fibers, since the needle punch method cannot be used at low basis weights and the fiber length is too long in the case of employing a dry method in the water punch method as well, there are problems with respect to difficulties in splitting.

On the other hand, a wet papermaking method offers the advantage of a faster production rate was compared with the aforementioned methods, and fibers of different fiber diameters and multiple types of fibers can be mixed in an arbitrary ratio with a single device. Namely, a wide selection of fiber shapes such as staples and pulp can be used, fibers can be used having fiber diameters ranging from ultrafine fibers of 7 μm or less to thick fibers, and raw fabric can be obtained that has much better alignment as compared with other methods. Moreover, in the splitting of division type composite fibers, division type composite fibers can be split completely in a refining step and dispersion step with a refining machine such as a pulper, high-speed mixer or beater. For these reasons, this method can be used to form raw fabrics having an extremely broad application range.

Therefore, a raw fabric of a non-woven fabric for an alkaline battery separator of the present invention is produced using a wet papermaking method. A uniform papermaking slurry is prepared by mixing 60 to 95% by weight of semi-aromatic polyamide fibers and 5 to 40% by weight of ethylene/vinyl alcohol copolymer fibers, dispersing in the water of a pulper and stirring gently using an agitator. A wet paper roll is then produced from this papermaking slurry using a papermaking machine having at least one wire such as a cylindrical papermaking machine, Fourdrinier papermaking machine or inclined Fourdrinier papermaking machine, and after adjusting the moisture content to 60 to 85%, the paper roll is contacted with a Yankee dryer or blowing hot air from a hot air hood dryer provided on top of the Yankee dryer simultaneous to making surface contact with the Yankee dryer to dry at a temperature equal to or above the melting temperature of the ethylene/vinyl alcohol copolymer fibers. Furthermore, in the case of additionally containing division type composite fibers, the amount of those fibers is split in water using a refining machine to form a dispersed slurry in which ultrafine fibers have been formed followed by mixing this with the aforementioned semi-aromatic polyamide fibers and ethylene/vinyl alcohol copolymer fibers.

Next, hydrophilic treatment is carried out to improve the electrolyte affinity of the raw fabric obtained in this manner. Corona discharge treatment, atmospheric pressure plasma treatment, fluorination treatment or surfactant treatment can be used for the hydrophilic treatment.

Corona discharge treatment is a surface modification method that generates a high-voltage corona discharge by providing a suitable gap between an electrode connected to a high-voltage generator and metal roll covered with silicone rubber and so forth followed by applying a voltage of several thousand to several ten thousand voltage at a high frequency. The raw fabric obtained by the aforementioned method is then passed through the gap at a suitable speed causing the ozone or nitrogen oxide generated by the corona discharge to react on the surface of the raw fabric and resulting in the formation of carboxyl groups, hydroxyl groups and peroxide groups, thereby improving the affinity of the electrolyte for the raw fabric.

Atmospheric pressure plasma treatment is a surface modification method in which a gaseous composition substantially composed of helium or argon and oxygen is fed into a plasma reaction device having a dielectric-coated electrode, in which a solid dielectric such as polyimide, mica, ceramics or glass is provided on the surface of at least one of a pair of opposing electrodes, to excite the plasma at atmospheric pressure and oxidize and etch the surface of a raw fabric located between the opposing electrodes followed to improve electrolyte affinity.

Fluorination treatment is a surface modification method in which a mixed gas comprising fluorine gas diluted with nitrogen gas or argon gas and at least one type of gas selected from oxygen gas, carbon dioxide gas and sulfur dioxide gas is contacted with a raw fabric to form carboxyl groups, carbonyl groups and hydroxyl groups on the surface, thereby improving electrolyte affinity.

Surfactant treatment is a surface modification method in which the raw fabric is impregnated with a solution of a nonionic surfactant such as polyoxyethylene alkyl ether or polyoxyethylene alkyl phenol ether, or coated or sprayed with this solution, followed by drying to improve the electrolyte affinity of the raw fabric surface.

Next, the thickness of a non-woven fabric for an alkaline battery separator of the present invention is adjusted by calendaring treatment using a combination of rubber and rubber, steel and steel, steel and rubber, cotton and steel or cotton and cotton. Calendaring treatment can also be carried out prior to hydrophilic treatment.

EXAMPLES

Although the following provides a more detailed explanation of the present invention using its examples, the present invention is not limited to these examples. Furthermore, the term "parts" or "%" in the examples refers to that based on weight unless specified otherwise.

Example 1

95% by weight of semi-aromatic polyamide fibers, in which 100 mol % of the dicarboxylic acid component comprising terephthalic acid and 100 mol % of the diamine component comprising 1,9-nonanediamine, and 5% by weight of ethylene/vinyl alcohol copolymer fibers were mixed, refined in the water of a pulper and gently stirred using an agitator to prepare a uniform papermaking slurry. The semi-aromatic polyamide fibers had a melt viscosity [η] as measured in conc. sulfuric acid at 30° C. of 1.0, a melting point of 317° C., a monofilament fineness of 0.5 dtex and a fiber length of 5 mm, while the ethylene/vinyl alcohol copolymer fibers had an ethylene content of 44 mol %, MFR of 11 g/10 minutes, monofilament fineness of 0.01 dtex and fiber length of 3 mm. This papermaking slurry was then used to produce a raw fabric having a basis weight of 60.0 g/m² and width of 50 cm using a wet papermaking method with a cylindrical papermaking machine. Next, corona treatment was performed on both sides of this raw fabric using an electrode measuring 20 mm wide by 600 mm, and a dielectric Hybalon measuring 3.2 mm, followed by calendaring treatment at a roll temperature of 60° C. to obtain a non-woven fabric for an alkaline battery separator having a thickness of 150 μm.

Example 2

With the exception of using 95% by weight of semi-aromatic polyamide fibers, in which 100 mol % of the dicarboxylic acid component comprising terephthalic acid, 50 mol % of the diamine component comprising 1,9-nonanediamine, and the remaining 50% of the diamine component comprising 2-methyl-1,8-octanediamine, and 5% by weight of ethylene/vinyl alcohol copolymer fibers, the semi-aromatic polyamide fibers having a melt viscosity [η] as measured in conc. sulfuric acid at 30° C. of 0.7, a melting point of 265° C., a monofilament fineness of 0.5 dtex and a fiber length of 5 mm, and the ethylene/vinyl alcohol copolymer fibers having an ethylene content of 44 mol %, MFR of 11 g/10 minutes, monofilament fineness of 0.01 dtex and fiber length of 3 mm, a non-woven fabric for an alkaline battery separator was obtained in the same manner as Example 1 having a basis weight of 59.5 g/m² and thickness of 151 μm.

Example 3

With the exception of using 80% by weight of semi-aromatic fibers of the same composition as Example 2 having a monofilament fineness of 0.7 dtex and fiber length of 5 mm, and using 20% by weight of ethylene/vinyl alcohol copolymer fibers having an ethylene content of 44 mol %, MFR of 11 g/10 minutes, monofilament fineness of 0.08 dtex and fiber length of 3 mm, a non-woven fabric for an alkaline battery separator was obtained in the same manner as Example 1 having a basis weight of 53.5 g/m² and thickness of 125 μm.

Example 4

With the exception of using 60% by weight of the semi-aromatic polyamide fibers used in Example 2, and using 40% by weight of ethylene/vinyl alcohol copolymer fibers having an ethylene content of 44 mol %, MFR of 11 g/10 minutes, monofilament fineness of 0.4 dtex and fiber length of 3 mm, a non-woven fabric for an alkaline battery separator was obtained in the same manner as Example 1 having a basis weight of 55.2 g/m² and thickness of 125 μm.

Comparative Example 1

A Nylon dry non-woven fabric manufactured by JAPAN Vilene Co., Ltd. composed of Nylon 6 fibers and Nylon 66 fibers (carded type, basis weight: 63.5 g/m², thickness: 150 μm) was used as a non-woven fabric for an alkaline battery separator.

Comparative Example 2

A raw fabric having a basis weight of 58.3 g/m² and a width of 50 cm was produced by a wet papermaking method with a cylindrical papermaking machine using 70% by weight of division type composite fibers having a monofilament fineness of 3.3 dtex, monofilament fineness after fiber spitting of 0.2 dtex (3.9 μm) and fiber length of 6 mm comprising highly crystalline polypropylene fibers having an MFR at 230° C. of 20 g/10 minutes and ethylene/vinyl alcohol copolymer having an ethylene content of 38 mol % and MFR of 16 g/10 minutes, 15% by weight of core-sheath type, heat-fused fibers having a monofilament fineness of 2.2 dtex (fiber diameter: 17.5 μm) and fiber length of 10 mm comprising a core component in the form of highly crystalline polypropylene having an MFR at 230° C. of 20 g/10 minutes and a sheath component in the form of ethylene/vinyl alcohol copolymer having an ethylene content of 38 mol % and an MFR of 16 g/10 minutes, and 15% by weight of polypropylene fibers having a monofilament fineness of 0.8 dtex (fiber diameter: 10.4 μm) and fiber length of 10 mm.

Next, this raw fabric was transported over a porous support in the form of 100 mesh stainless steel wire followed by water punching treatment using high-pressure columnar water flow to obtain a water-punched non-woven fabric. The conditions of water punching treatment consisted of using three nozzle heads with the first head having a nozzle diameter of 120 μm and using water pressure of 70 kg/cm² at nozzle pitch of 0.6 mm, the second head having a nozzle diameter of 100 μm and using water pressure of 100 kg/cm² at a nozzle pitch of 0.6 mm, and the third head having a nozzle diameter of 100 μm and using water pressure of 130 kg/cm² at a nozzle pitch of 0.6 mm, and a processing rate of 15.0 m/minute. Water punching treatment was first carried out on one side and then carried out on the bottom side under the same conditions. This water-punched non-woven fabric was then dried by blowing hot air at 110° C. from a hot air hood dryer. Next, corona discharge treatment was carried out on both sides of the water-punched non-woven fabric followed finally by calendaring treatment at normal temperature to obtain a non-woven fabric for an alkaline battery separator having a thickness of 151 μm.

Example 5

With the exception of using 75% by weight of semi-aromatic polyamide fibers having monofilament fineness of 0.6 dtex and fiber length of 5 mm, in which 100 mol % of the dicarboxylic acid component comprising terephthalic acid, 50 mol % of the diamine component comprising 1,9-nonanediamine, and the remaining 50% of the diamine component comprising 2-methyl-1,8-octanediamine, and 25% by weight of ethylene/vinyl alcohol copolymer fibers having an ethylene content of 44 mol %, MFR of 11 g/10 minutes, mono-filament fineness of 0.01 dtex and fiber length of 3 mm, a non-woven fabric for an alkaline battery separator was obtained in the same manner as Example 1 having a basis weight of 36.5 g/m² and thickness of 85 μm.

Example 6

With the exception of adding 10% by weight of division type composite fibers to 70% by weight of the semi-aromatic polyamide fibers used in Example 2 and 20% by weight of ethylene/vinyl alcohol copolymer fibers having an ethylene content of 44 mol %, MFR of 11 g/10 minutes, monofilament fineness of 0.08 dtex and fiber length of 3 mm, a non-woven fabric for an alkaline battery separator was obtained in the same manner as Example 1 having a basis weight of 37.0 g/m² and thickness of 80 μm. Here, the division type composite fibers were laminated division type composite fibers having a monofilament fineness of 3.3 dtex, monofilament fineness after splitting of 0.3 dtex and fiber length of 5 mm comprising the semi-aromatic polyamide of Example 2 and crystalline polypropylene at a weight ratio of 7:3.

Example 7

With the exception of adding 20% by weight of the division type composite fibers of semi-aromatic polyamide and crystalline polypropylene used in Example 6 to 60% by weight of the semi-aromatic polyamide fibers used in Example 2 and 20% by weight of ethylene/vinyl alcohol copolymer fibers having an ethylene content of 44 mol %, MFR of 11 g/10 minutes, monofilament fineness of 0.08 dtex and fiber length of 3 mm, a non-woven fabric for an alkaline battery separator was obtained in the same manner as Example 1 having a basis weight of 36.7 g/m² and thickness of 82 μm.

Comparative Example 3

50% by weight of the division type composite fibers used in Comparative Example 2, 30% by weight of core-sheath type, heat-fused fibers having a monofilament fineness of 0.6 dtex and fiber length of 3 mm comprising a core component in the form of polypropylene and a sheath component in the form of high-density polyethylene, and 20% by weight of polypropylene fibers having a mono-filament fineness of 0.08 dtex and fiber length of 3 mm were mixed followed by refining in the water of a pulper and gently stirring using an agitator to prepare a uniform papermaking slurry. A raw fabric having a basis weight of 35.0 g/m² and a width of 50 cm was then produced using this papermaking slurry by a wet papermaking method with a cylindrical papermaking machine. Next, corona treatment was performed on both sides of this raw fabric using an electrode measuring 20 mm wide by 600 mm, and a dielectric Hybalon measuring 3.2 mm, followed by calendaring treatment at normal temperature to obtain a non-woven fabric for an alkaline battery separator having a thickness of 80 μm.

The characteristic values of the non-woven fabrics for an alkaline battery separator produced in Examples 1 to 7 and Comparative Examples 1 to 3 were measured according to the measurement methods described below, and then evaluated according to evaluation methods. The characteristic values and performance evaluation results are shown in Tables 1 and 2.

<Measurement Methods>

[Basis Weight]

Basis weight was evaluated by adjusting to moisture equilibrium by allowing to stand in a test room at a temperature of 25° C. and relative humidity of 55% followed by weighing 10 test pieces measuring 50 mm (direction of width)×200 mm (direction of length) with an electronic balance to three decimal places, converting to weight per square meter (g/m²) and taking the average value.

[Thickness]

Thickness was evaluated by using a dial thickness gauge (micrometer) having a diameter of 6.3 mm to measure the thickness (μm) at six different locations each of five test pieces and taking the average value.

[Alkaline Resistance]

Alkaline resistance was evaluated according to the weight loss rate (%) following alkaline treatment. The weight loss rate following alkaline treatment was evaluated by sampling three test pieces measuring 10 cm×10 cm from each sample, and after measuring the weight W (mg) after having reached moisture equilibrium, immersing in an aqueous KOH solution having a specific gravity of 1.30 equivalent to electrolyte and storing for 20 days in an atmosphere at 90±2° C. After storing, the samples were taken out followed by washing and drying until they reached the neutral point. The weight $W_2$ (mg) was then measured when the samples again reached moisture equilibrium to determine the weight loss rate (%) following alkaline treatment using the following formula 1.

Weight loss ratio following alkaline treatment (%)= $[(W-W_2)/W]\times100$     (Formula 1)

[Tensile Strength]

Tensile strength was evaluated in accordance with JIS L 1096 for 10 test pieces measuring 50 mm (direction of width)×200 mm (direction of length) by pulling using a constant-speed drawing tensile tester under conditions of a clamping interval of 100 mm and pulling rate of 300 mm/min, using the load value at breakage to represent tensile strength (kN/m) and taking the average value. A tensile strength within the range of 1.96 kN/m or more is preferable for use as a non-woven fabric for an alkaline battery separator in order to withstand tension during the battery production process and inhibit widening caused by stretching of the non-woven fabric.

[Pore Diameter]

Pore diameter was evaluated by measuring the maximum pore diameter and average pore diameter with the Coulter Porometer manufactured by Coulter Electronics.

[Low Rate Lifetime]

The remaining ten transformed sealed nickel-cadmium batteries were then evaluated for low rate lifetime according to the number of charging and discharging cycles consisting of charging for 30 hours with a 20 hour rate current at 70° C. and discharging with a 1 hour rate current until the terminal voltage decreased to 1.0 V. Low rate lifetime was evaluated with an X in the case of less than 80 cycles, a Δ in the case of 81 to 150 cycles, or a ○ in the case of 151 cycles or more.

TABLE 1

|  | Example 1 | Example 2 | Example 3 | Example 4 | Comparative Example 1 | Comparative Example 2 |
|---|---|---|---|---|---|---|
| Basis weight g/m$^2$ | 60.0 | 59.5 | 53.5 | 55.2 | 63.5 | 58.3 |
| Thickness μm | 150 | 151 | 125 | 125 | 150 | 151 |
| Alkaline resistance % | 2.3 | 2.9 | 2.9 | 3.6 | 33.2 | 2.1 |
| Tensile strength kN/m | 2.06 | 2.02 | 2.74 | 3.49 | 3.57 | 2.55 |
| Max. pore diameter μm | 48.1 | 48.9 | 38.4 | 42.9 | 58.3 | 33.2 |
| Avg. pore diameter μm | 18.9 | 19.2 | 20.6 | 19.2 | 22.7 | 16.2 |
| Leakage resistance | ○ | ○ | ○ | ○ | Δ | ○ |
| High rate discharge characteristics | 108 | 107 | 105 | 101 | 107 | 100 |
| Low rate lifetime characteristics | ○ | ○ | ○ | ○ | X | ○ |

<Evaluation Methods>

[Leakage Resistance]

200 coiled electrode assemblies were fabricated by using one each of a paste-type nickel hydroxide positive electrode (40 mm wide) using a nickel foam material for the electrode collector and a sintered-type cadmium negative electrode (40 mm wide) using a nickel-plated punching metal, interposing a non-woven fabric for an alkaline battery separator (43 mm wide) of the aforementioned examples and comparative examples between the electrodes, and winding using battery assembly machinery. The resistance between the positive and negative electrodes of these electrode assemblies was measured and resistance values of 500 kΩ or more were treated as being indicative of a leakage defect. Leakage resistance was evaluated with a ○ for leakage defects of 1% or less, a Δ for leakage defects of 2-3%, or an X in the case of leakage defects in excess of 3%.

[High Rate Discharge Voltage]

Twenty size SUM3 sealed nickel-cadmium batteries having a nominal capacitance of 0.7 Ah were fabricated by housing the aforementioned coiled electrode assemblies in cylindrical metal cases followed by injecting alkaline electrolyte consisting mainly of 7 N aqueous potassium hydroxide solution containing 1 N lithium hydroxide and attaching sealing covers provided with a safety valve. In order to transform the batteries, the prepared batteries were repeatedly charged and discharged four times consisting of charging for 15 hours at a 10 hour rate at 25° C. and then discharging at a 1 hour current rate until the terminal voltage decreased to 0.8 V. Ten of the transformed sealed nickel-cadmium batteries were then charged at a 0.5 hour rate current at 25° C. followed by measurement of the average voltage when discharged at a 0.5 hour rate current to evaluate the high rate discharge voltage as an index in the case of assigning a value of 100 to a polyolefin-based non-woven fabric for an alkaline battery separator.

TABLE 2

|  | Example 5 | Example 6 | Example 7 | Comparative Example 3 |
|---|---|---|---|---|
| Basis weight g/m$^2$ | 36.5 | 37.0 | 36.7 | 35.0 |
| Thickness μm | 85 | 80 | 82 | 80 |
| Alkaline resistance % | 3.4 | 3.2 | 3.4 | 2.7 |
| Tensile strength kN/m | 2.16 | 2.35 | 2.27 | 1.67 |
| Max. pore diameter μm | 50.5 | 34.1 | 27.4 | 34.9 |
| Avg. pore diameter μm | 24.3 | 22.4 | 14.9 | 18.4 |
| Leakage resistance | Δ | ○ | ○ | X |
| High rate discharge characteristics | 105 | 105 | 105 | 100 |
| Low rate lifetime characteristics | Δ | ○ | ○ | ○ |

Evaluation

Table 1 shows a comparison of the characteristics of non-woven fabrics for an alkaline battery separator having basis weights of 53 to 63 g/m$^2$ and thicknesses of 125 to 150 μm. Since the non-woven fabrics of Examples 1 to 4 use semi-aromatic polyamide fibers having superior chemical resistance and heat resistance, and ultrafine fibers of chemically resistant ethylene/vinyl alcohol copolymers for the binder fibers, their alkaline resistance was far superior to the separator non-woven fabric comprising the aliphatic polyamide fibers of Comparative Example 1, and about equal to that of the polyolefin-based separator non-woven fabric shown in Comparative Example 2. As a result, the low rate lifetime characteristics of Examples 1 to 4 are far superior to those of Comparative Example 1.

High rate discharge characteristics were such that the discharge voltage was able to be increased for the polyamide-based separator non-woven fabrics of Examples 1 to 4 as compared with the polyolefin-based separator non-woven fabric of Comparative Example 2.

Example 1 demonstrated superior alkaline resistance and high rate discharge characteristics due to the higher degree of crystallinity than Example 2.

Although Example 1 and Examples 3 and 4 depicted cases in which the blending ratio of semi-aromatic polyamide fibers was gradually decreased while the blending ratio of the binder fibers was increased, despite tensile strength increasing the higher the blending ratio of the binder fibers, since high rate discharge characteristics decreased, it was found to be necessary that the blending ratio of the semi-aromatic polyamide fibers be at least 60% by weight.

Table 2 shows a comparison of the characteristics of non-woven fabrics for an alkaline battery separator having basis weights of no more than 40 g/m² and thicknesses of about 80 μm. Although Example 5 depicts a non-woven fabric comprising 75% by weight of semi-aromatic polyamide fibers and 25% by weight of ethylene/vinyl alcohol copolymer fibers, as the basis weight becomes smaller and the thickness of the non-woven fabric decreases, although alkaline resistance and tensile strength are roughly equal to those of Example 1, leakage resistance and low rate lifetime characteristics are somewhat decreased. In contrast, in Examples 6 and 7 that contain division type composite fibers comprising semi-aromatic polyamide and polypropylene in addition to semi-aromatic polyamide fibers and ethylene/vinyl alcohol copolymer fibers, both leakage resistance and low rate lifetime characteristics are superior, and even at a basis weight of 40 g/m² or less and thickness of about 80 μm, battery separator non-woven fabrics were able to be produced that also demonstrated high rate discharge characteristics. In addition, the high rate discharge characteristics of the separator non-woven fabrics obtained in Examples 6 and 7 were determined to be superior to those of the polyolefin-based separator non-woven fabric of Comparative Example 3.

Example 8

5% by weight of non-stretched semi-aromatic polyamide fibers were added to 90% by weight of semi-aromatic polyamide fibers and 5% by weight of ethylene/vinyl alcohol copolymer fibers, mixed and refined in the water of a pulper and then gently stirred using an agitator to prepare a uniform papermaking slurry. Here, the semi-aromatic polyamide fibers were prepared from a dicarboxylic acid component in which 100% was terephthalic acid and a diamine component in which 50% was 1,9-nonane diamine and the remaining 50% was 2-methyl-1,8-octane diamine, and had a monofilament fineness of 0.7 dtex, fiber length of 5 mm and melting point of 265° C., while the ethylene/vinyl alcohol copolymer fibers had an ethylene content of 44 mol %, fineness of 0.01 dtex and fiber length of 3 mm, and the non-stretched polyamide fibers were composed in the same manner as the aforementioned semi-aromatic polyamide fibers and had a fineness of 1.6 dtex, fiber length of 5 mm and melting point of 265° C.

This papermaking slurry was then used to produce a raw fabric having a basis weight of 60.0 g/m² and width of 50 cm using a wet papermaking method with a cylindrical papermaking machine. Next, corona treatment was performed on both sides of this raw fabric using an electrode measuring 20 mm wide by 600 mm, and a dielectric Hybalon measuring 3.2 mm, followed by calendaring treatment at a roll temperature of 60° C. to obtain a non-woven fabric for an alkaline battery separator having a thickness of 150 μm.

Comparative Example 4

With the exception using core-sheath type, heat-fused fibers having a fineness of 1.6 dtex and fiber length of 10 mm comprising a core component in the form of polypropylene having a melting point of 155° C. and a sheath component in the form of polyethylene having a melting point of 135° C., a non-woven fabric was obtained in the same manner as Example 1 having a basis weight of 60.0 g/m² and thickness of 150 μm.

These alkaline battery separators were evaluated as indicated below. The results are shown in Table 3.

<Measurement Methods>

[Liquid Retention Rate]

A test piece measuring 150 mm×100 mm was immersed for 1 hour in aqueous KOH solution having a specific gravity of 1.3 (concentration: 31% by weight) and then drained for 10 minutes. The weight of the test piece before treatment ($W_0$) and the weight of the test piece after treatment ($W_1$) were measured to determine the liquid retention rate (%) according to the following formula 2.

$$\text{Liquid retention rate (\%)} = [(W_1 - W_0)/W_0] \times 100 \quad \text{(Formula 2)}$$

[Low Rate Lifetime]

This was measured and evaluated in the same manner as in Examples 1 to 7 and Comparative Examples 1 to 3.

TABLE 3

|  | Liquid retention rate (%) | Low rate lifetime evaluation |
|---|---|---|
| Example 8 | 270 | Δ |
| Comparative Example 4 | 220 | X |

The alkaline battery separator of Example 8 demonstrated a higher liquid retention rate and superior battery life at 90° C. as compared with Comparative Example 5.

Example 9

5% by weight of para-type completely aromatic polyamide fibers were added to 90% by weight of semi-aromatic polyamide fibers and 5% by weight of ethylene/vinyl alcohol copolymer fibers, mixed and refined in the water of a pulper and then gently stirred using an agitator to prepare a uniform papermaking slurry. Here, the semi-aromatic polyamide fibers were fibers in which 100% of the dicarboxylic acid component was terephthalic acid, 50% of the diamine component was 1,9-nonane diamine and the remaining 50% of the diamine component was 2-methyl-1,8-octane diamine, and having a monofilament fineness of 0.7 dtex, fiber length of 5 mm, melting point of 265° C. and tensile strength of 3.7 cN/dtex, while the ethylene/vinyl alcohol copolymer fibers were fibers having an ethylene content of 44 mol %, monofilament fineness of 0.01 dtex and fiber length of 3 mm, and the para-type completely aromatic polyamide fibers were fibers having a monofilament fineness of 1.3 dtex, fiber length of 6 mm and tensile strength of 18 cN/dtex.

This papermaking slurry was then used to produce a raw fabric having a basis weight of 39.0 g/m² and width of 50 cm using a wet papermaking method with a cylindrical papermaking machine. Next, calendaring treatment was carried out using a roll temperature of 200° C. followed by corona treatment on both sides of this raw fabric using an electrode measuring 20 mm wide by 600 mm, and a dielectric Hybalon measuring 3.2 mm to produce a non-woven fabric having a basis weight of 39.0 g/m² and thickness of 100 μm that was used as an alkaline battery separator.

Example 10

As an example of a non-woven fabric not using high-strength fibers, 95% by weight of semi-aromatic polyamide fibers and 5% by weight of ethylene/vinyl alcohol copolymer fibers were mixed, refined in the water of a pulper and then gently stirred using an agitator to prepare a uniform papermaking slurry. This papermaking slurry was then used to produce a raw fabric having a basis weight of 38.0 g/m² and width of 50 cm using a wet papermaking method with a cylindrical papermaking machine. Next, corona treatment was performed on both sides of this raw fabric using an electrode measuring 20 mm wide by 600 mm, and a dielectric Hybalon measuring 3.2 mm followed by calendaring treatment at a roll temperature of 60° C. and adjustment of thickness to produce a non-woven fabric having a basis weight of 38.0 g/m² and thickness of 100 μm that was used as an alkaline battery separator.

Here, the semi-aromatic polyamide fibers were the same as those used in Example 9, and the ethylene/vinyl alcohol copolymer fibers had an ethylene content of 44 mol %, monofilament fineness of 0.08 dtex and fiber length of 3 mm.

Evaluation of the defect rate during battery production and a rapid charging and discharging test were conducted on these fabrics according to the methods described below. Those results are shown in Table 4.

<Evaluation Methods>

[Evaluation of Defect Rate During Battery Production]

Coiled electrode assemblies were fabricated by using one each of a paste-type nickel hydroxide positive electrode (40 mm wide), using a nickel foam material for the electrode collector, and hydrogen-occluding alloy negative electrode (40 mm wide), also using a nickel foam material, interposing an aforementioned alkaline battery separator (43 mm wide) between the electrodes, and winding using battery assembly machinery. After housing the coiled electrode assemblies in cylindrical metal cases, alkaline electrolyte was injected consisting mainly of 7 N aqueous potassium hydroxide solution containing 1 N lithium hydroxide and sealing covers provided with a safety valve were attached to produce 10,000 size SUM3 sealed nickel-hydrogen batteries having a nominal capacitance of 1.8 Ah. Subsequently, a voltage of 240 V was applied between the positive and negative electrodes and the defect rate (%) during production of 10,000 batteries was determined by defining those batteries having an electrical resistance of 1 kΩ or more as being defective.

[Rapid Charging and Discharging Test]

Ten size SUM3 sealed nickel-cadmium batteries were produced having a nominal capacitance of 0.7 Ah using the same method as previously described. In order to transform the batteries, the batteries were repeatedly charged and discharged four times consisting of charging for 15 hours at 0.1 C and 25° C. and then discharging at a current of 1 C until the terminal voltage decreased to 0.8 V. The transformed batteries were then repeatedly charged and discharged using a cycle consisting of charging for 1.2 hours at a current of 1 C and discharging at a current of 1 C until the terminal voltage decreased to 1.0 V to evaluate battery life. Battery life was evaluated with an X in the case of less than 500 cycles, a Δ in the case of 500 to 749 cycles, or a ○ in the case of 750 cycles or more.

TABLE 4

| | Defect rate during battery production (%) | Rapid charging and discharging test |
|---|---|---|
| Example 9 | 0.03 | ○ |
| Example 10 | 0.12 | ○ |

Although the alkaline battery separator obtained in Example 10 was comprised of semi-aromatic polyamide fibers and binder fibers in the form of ethylene/vinyl alcohol copolymer, and the adhesiveness with the binder fibers was satisfactory, due to the low mechanical strength of the fibers, the strength of the non-woven fabric is low and the defect rate during battery production is somewhat high. However, in the alkaline battery separator obtained in Example 9, since the high-strength fibers improve mechanical strength, the non-woven fabric has extremely superior mechanical strength, thereby making it possible to significantly reduce the defect rate during battery production. Furthermore, stable battery operation was confirmed in both Examples 9 and 10 in the rapid charging and discharging test at 90° C.

INDUSTRIAL APPLICABILITY

A non-woven fabric for an alkaline battery separator of the present invention is formed from a non-woven fabric comprising 60 to 95% by weight of semi-aromatic polyamide fibers formed from a mixture of a dicarboxylic acid component of which 60 mol % or more is an aromatic dicarboxylic acid component, and preferably a terephthalic acid component, and a diamine component of which 60 mol % or more is an aliphatic alkylene diamine component and preferably a 1,9-nonane diamine component or 2-methyl-1,8-octane diamine component, and 5 to 40% by weight of binder fibers in the form of ethylene/vinyl alcohol copolymer having a monofilament fineness of 0.01 to 0.5 dtex, having superior alkaline resistance in which the weight loss rate of the separator non-woven fabric 20 days after an alkaline resistance test in aqueous KOH solution having a specific gravity of 1.30 at 90° C. is 5% or less. In addition, since the separator non-woven fabric of an alkaline secondary battery has superior leakage resistance, low rate lifetime and high rate discharge characteristics, it can be used preferably as a separator non-woven fabric of an alkaline secondary battery required to have large-current discharge and higher capacity.

Moreover, a separator non-woven fabric of an alkaline secondary battery additionally comprising division type composite fibers formed from this semi-aromatic polyamide and one type of polymer selected from the group consisting of polyphenylene sulfide, polymethylpentene and polypropylene can be held to a maximum pore diameter of 50 μm or less and average pore diameter of 20 μm or less even if the basis weight is 45 g/m² or less and the thickness of 100 μm or less. As a result, capacity can be increased even further.

In addition, as a result of additionally comprising non-stretched semi-aromatic polyamide fibers or high-strength fibers, a non-woven fabric for an alkaline battery separator of the present invention is able to significantly reduce the defect rate during battery production in the case of having reduced the electrolyte retention rate or basis weight.

Thus, since the present invention enables rapid charging and large-current discharging while also allowing thickness to be reduced thereby allowing higher capacity, it is preferable as a non-woven fabric for an alkaline battery separator having superior alkaline resistance, thereby having extremely high industrial applicability.

The invention claimed is:

1. A non-woven fabric for an alkaline battery separator comprising
   a non-woven fabric prepared by a wet papermaking method, which contains semi-aromatic polyamide fibers, prepared from a dicarboxylic acid component in which 60 mol % or more of the dicarboxylic acid component is an aromatic carboxylic acid component and a diamine component in which 60 mol % or more of the diamine component is an aliphatic alkylene diamine having 6 to 12 carbon atoms, and
   ethylene/vinyl alcohol copolymer fibers having an ethylene content of 20 to 70 mol % as a binder fiber having hygrothermal adhesiveness,
   wherein the separator non-woven fabric has an alkaline resistance in which the weight loss rate after 20 days is 5% or less in an alkaline resistance test at 90° C. in an aqueous KOH solution having a specific gravity of 1.30.

2. The non-woven fabric for an alkaline battery separator according to claim 1, wherein the semi-aromatic polyamide fibers are 60 to 95% by weight, and the ethylene/vinyl alcohol copolymer fibers are 5 to 40% by weight.

3. The non-woven fabric for an alkaline battery separator according to claim 1, wherein the ethylene/vinyl alcohol copolymer fibers have a monofilament fineness of 0.01 to 0.5 dtex.

4. The non-woven fabric for an alkaline battery separator according to claim 1, wherein the semi-aromatic polyamide fibers are prepared from a dicarboxylic acid component comprising terephthalic acid and a diamine component comprising 1,9-nonane diamine or a mixture of 1,9-nonane diamine and 2-methyl-1,8-octane diamine.

5. The non-woven fabric for an alkaline battery separator according to claim 1, wherein the non-woven fabric for an alkaline battery separator additionally comprises division type composite fibers formed from the semi-aromatic polyamide and at least one type of polymer selected from the group consisting of polyphenylene sulfide, polymethylpentene and polypropylene.

6. The non-woven fabric for an alkaline battery separator according to claim 5, wherein the content of the division type composite fibers is 5 to 30% by weight relative to the total amount of fibers.

7. The non-woven fabric for an alkaline battery separator according to claim 1, wherein the non-woven fabric for an alkaline battery separator additionally comprises non-stretched semi-aromatic polyamide fibers.

8. The non-woven fabric for an alkaline battery separator according to claim 7, wherein the content of the non-stretched semi-aromatic polyamide fibers is 1 to 10% by weight relative to the total amount of fibers.

9. The non-woven fabric for an alkaline battery separator according to claim 1, wherein the non-woven fabric for an alkaline battery separator additionally comprises high-strength fibers.

10. The non-woven fabric for an alkaline battery separator according to claim 9, wherein the content of the high-strength fibers is 1 to 10% by weight relative to the total amount of fibers.

11. The non-woven fabric for an alkaline battery separator according to claim 1, wherein the basis weight is 45 g/m² or less, the thickness is 100 μm or less, the tensile strength is 1960 N/m or more, the maximum pore diameter is 50 μm or less, and the average pore diameter is 20 μm or less.

* * * * *